United States Patent
Nori et al.

[19]

[11] Patent Number: 6,112,210

[45] Date of Patent: Aug. 29, 2000

[54] APPARATUS AND METHOD FOR NULL REPRESENTATION IN DATABASE OBJECT STORAGE

[75] Inventors: Anil Nori, Fremont; John Weisz, Belmont; Subramanian Muralidhar, Sunnyvale, all of Calif.

[73] Assignee: Oracle Corporation, Redwood Shores, Calif.

[21] Appl. No.: 08/962,416

[22] Filed: Oct. 31, 1997

[51] Int. Cl.[7] ............................................... G06F 17/30
[52] U.S. Cl. .............................................................. 707/103
[58] Field of Search .................................. 707/103, 203

[56] References Cited

U.S. PATENT DOCUMENTS

| | | | |
|---|---|---|---|
| 5,437,027 | 7/1995 | Bannon et al. | 707/103 |
| 5,701,472 | 12/1997 | Koerber et al. | 707/203 |
| 5,838,965 | 11/1998 | Kavanagh et al. | 707/103 |

*Primary Examiner*—Wayne Amsbury
*Assistant Examiner*—Cheryl Lewis
*Attorney, Agent, or Firm*—McDermott, Will & Emery

[57] ABSTRACT

An apparatus and process for storing representations of information objects having null values in a database are disclosed. A null object is established in memory associated with an information-bearing object. The null object has an attribute null value corresponding to each data-bearing attribute of the information-bearing object. Each attribute null value is set to a value indicating whether the corresponding attribute of the information-bearing object is null, not null, or not capable of having a null value. The null object also has an atomic null value that indicates whether the entire information-bearing object is null. When the information-bearing object is to be accessed, the null object is first accessed to determine whether the entire information-bearing object or any attributes thereof are null. Accordingly, unnecessary retrieval and manipulation of the information-bearing object is avoided.

45 Claims, 12 Drawing Sheets

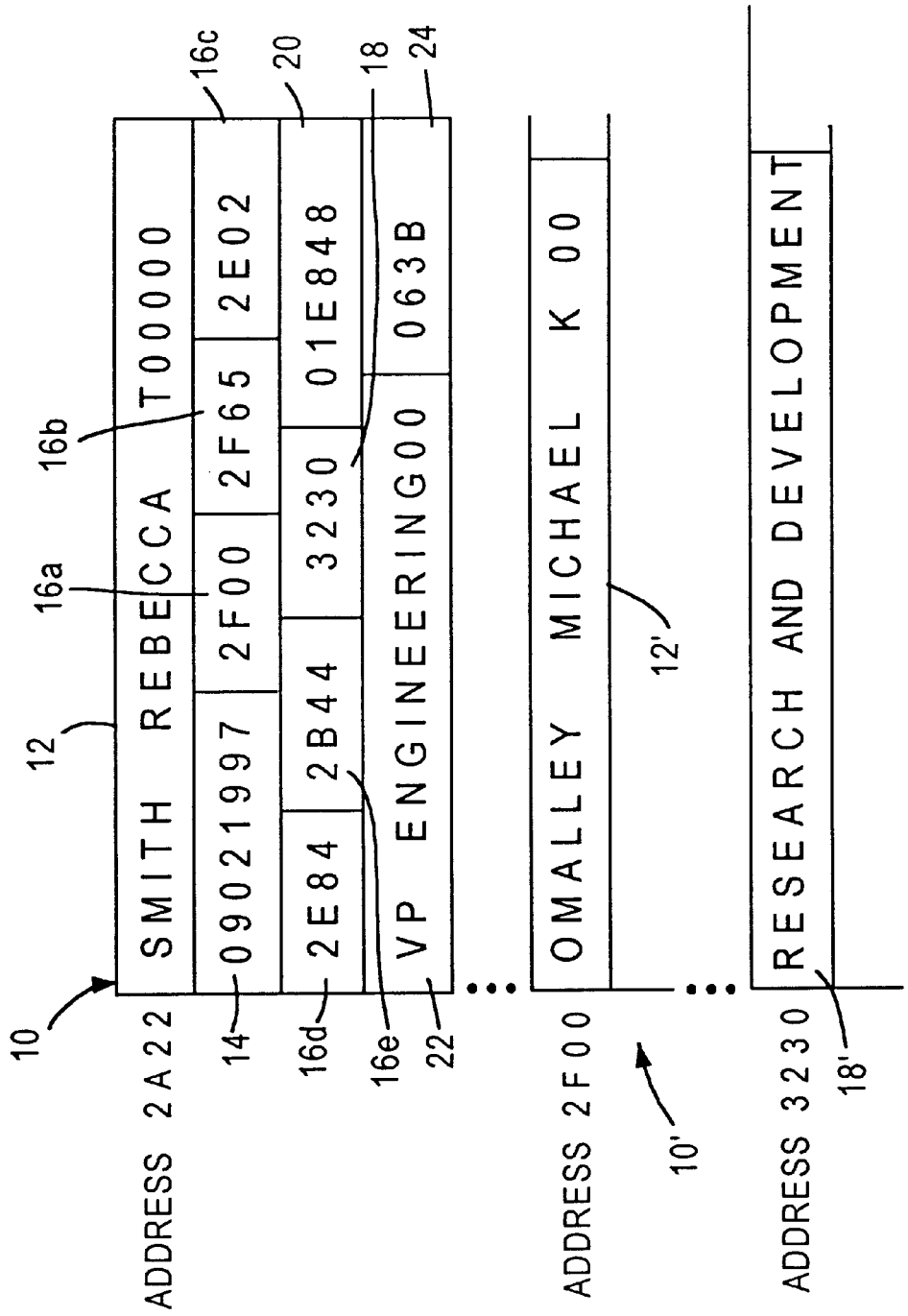

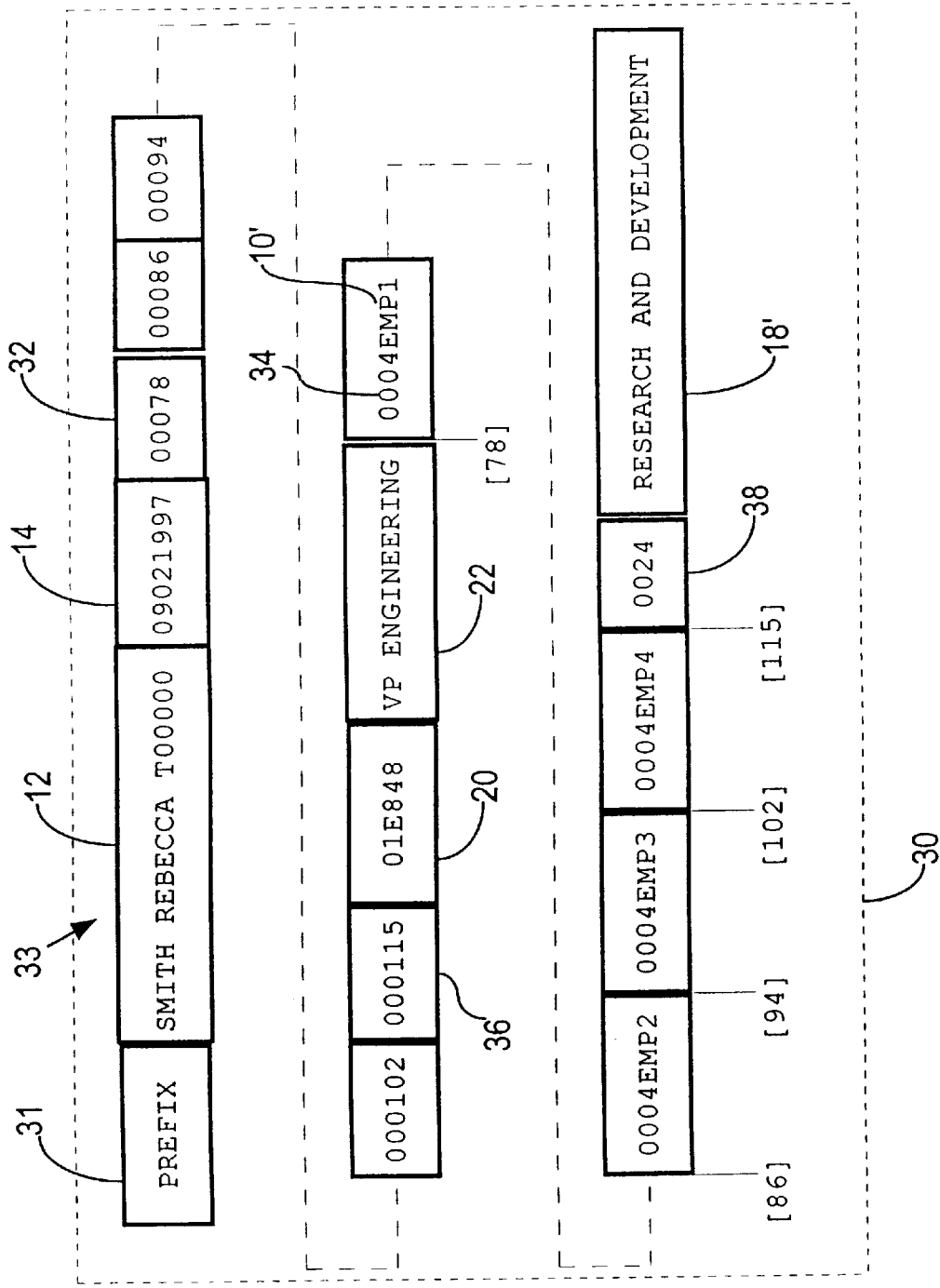

FIGURE 2A

| ROWID | OID | IMAGE |
|---|---|---|
| 064923 | 10081964 | [PREFIX] SMITH REBECCA T 00000 09021997 29 20 OMALLEY |
| 089242 | 02271989 | [PREFIX] YOUNGER STEVEN J0000 06121984 29 20 DONOHUE |
| ... | ... | ... |

FIGURE 2B

| ROWID | OID | PREFIX | ATTRIB 1 | ATTRIB 2 | ATTRIB 3 |
|---|---|---|---|---|---|
| 44 | 46 | 52 | 54 | 56 | 58 |
| 064923 | 10081964 | [PREFIX] | SMITH REBECCA T00000 (60a) | 09021977 (60b) | OMALLEY MICHAEL K (60c) |
| ... | ... | ... | ... 50 | ... | ... |

30

APPARATUS AND METHOD FOR NULL REPRESENTATION IN DATABASE OBJECT STORAGE

FIELD OF THE INVENTION

This invention generally relates to data processing, and relates more specifically to methods of storing information objects in a database system.

BACKGROUND OF THE INVENTION

Database systems are computer programs optimized for creating, storing, manipulating, and reporting on information stored in tables. The tables are organized as an array of rows and columns. The values in the columns of a given row are typically associated with each other in some way. For example, a row may store a complete data record relating to a sales transaction, a person, or a project. Columns of the table define discrete portions of the rows that have the same general data format. For example, columns define fields of the records.

Modern computer programming languages permit information to be defined by an "abstract data type" (ADT), object type or class. Object types provide a way to model real world information. In computer programs written using a language that supports object types or classes, every constant, variable, expression, function, or combination has a certain type. Thus, an object type is a representation of the structure of the data and the operations (or behavior) associated with the data. An object type is made into an explicit representation of the type using a declaration of the constant, variable, or function. The thing that is declared is called an information object or simply an object. In object-oriented programming languages such as C++ and Java, objects may store a combination of data and methods for acting on the data. An object is "instantiated" or created when the program is run, based upon the declaration of the object.

For example, in the C language a programmer can define an object type as:

typedef enum weekday {Monday, Tuesday, Wednesday, Thursday, Friday};

This example assumes that earlier in the same program, the days of the week have been defined. The programmer can then define an explicit object of the type <weekday>: weekday Day;

Thereafter, the programmer can use the variable in expressions that refer to values of the abstract data type, such as: Day=Thursday;

A detailed discussion of object types and data structures is provided in N. Wirth, "Algorithms+Data Structures= Programs" (Englewood Cliffs, N.J.: Prentice-Hall, 1976). In this context, the term "ADT" refers broadly to the concepts of abstract data types, object types, and classes.

ADTs may be considerably more complex than the type <weekday> shown above. An ADT may comprise scalar data types such as integers and other numeric types, characters or strings, pointers, other ADTs, database tables, or arrays defined and stored in association with each other. Each such component of the ADT is called an attribute. Object-relational database systems, in addition to storing scalar data (like integers, strings), can store objects as well. The reason for storing objects is to minimize mismatch between applications and the database system. However, database systems are known to operate fastest and with greatest efficiency when simple data types are stored in the database tables. Accordingly, storing objects defined by complex ADTs in a database table presents a difficult problem.

One approach to this problem is to separate the attributes of an ADT and store each attribute in a column of a database table. In this approach, each row represents an instantiated object, and the object is said to be stored in "unpacked" format. This approach is used in the commercial products known as Illustra and UNI-SQL. This approach has the advantage that standard database operations such as indexing, sorts and filters can be carried out on the stored object.

However, a disadvantage of this approach is that the attributes of the object must be identified, separated, and individually written to database columns whenever the object is stored. When the database table is created, each column of the database must be declared to have a data type compatible with the data type of the attribute of the object to be stored in that column. This is difficult or impossible in the case of attribute data types that are not supported or recognized by the database.

Also, when the object is retrieved using the database table, each stored attribute of the object must be read from columns of the table, and the attributes then must be assembled into an object. This is inefficient because it requires processing operations to be carried out on attributes that are not necessarily needed by the program that is storing or retrieving the object to or from the database. Past systems such as Illustra and UNI-SQL do not provide a way to retrieve the information object from the database table as a single object assembled as defined in its ADT. Rather, in these past approaches, the information of the object can be retrieved only as a series of discrete items stored in columns.

Another disadvantage of this approach is that it is awkward to use in a complex, distributed system or network that interconnects different types of computers and program processes. Data are not universally transportable from one computer to any other computer. Different computers, operating systems, programming languages, and application software often use different native forms or formats for representing data. For example, several different formats can be used to represent numbers in a computer memory. Some processors represent a numeric value in memory as a string of bits in which the least significant bit is at the lowest memory location. Other processors represent values with the most significant bit at the lowest memory location. One type of processor cannot directly access and use values stored in a memory that were created by the other type of processor. This is known as a format representation problem. Examples of such incompatible processors are the SPARC and VAX processors.

Incompatibilities also exist among different programming languages that are usable on the same platform. For example, such modem programming languages as C and Pascal enable a programmer to express a set of information in a complex abstract data type such as a record or structure, but there is no universal protocol for representing such abstract data types in a computer memory. This incompatibility increases the complexity of computer systems and makes data interchange difficult and inefficient. In addition, such abstract data types may include pointers or addresses that direct a compiler or processor to another memory location a portion of the data of the abstract data type is located. Not all programming languages use or understand pointers. Some programming languages permit a pointer to reference the same abstract data type that contains the pointer. Such "circular references" are not compatible with all languages or platforms and cannot easily be transported over a network.

Further, different processors may represent a data type of a programming language in different ways. One processor may represent a floating-point number in four bytes while another processor may represent it in eight bytes. Thus, data created in memory by the same program running on different processors is not necessarily interchangeable. This is known as a layout representation incompatibility.

Alignment representation presents yet another problem in data interchange. With some processors, particular values or data types must be aligned at a particular memory location. When data is interchanged, there is no assurance that the inbound information uses the alignment required by the computer receiving the information.

Still another problem is inheritance representation. Certain object-oriented programming languages, such as C++, support the concept of inheritance, whereby an abstract data type may inherit properties of a previously defined abstract data type. Languages that support inheritance provide extra pointer fields in memory representations of abstract data types or classes that use base classes and functions defined at runtime. The value of an inheritance pointer is not known until runtime, and is not persistent. Therefore, transmission from one system to another of an instance of an abstract data type that inherits properties from another abstract data type is not generally practical.

Character representation is another problem. Computers used in different nations of the world also may use incompatible character sets. Data formatted in one character set cannot be directly used or interpreted by a system that uses a different character set.

In a networked computer environment, these problems are more acute. A network may comprise several different types of computers, platforms, or application programs. A programmer writing software for use in a widely distributed network has no assurance that a destination or target computer can understand information sent from a source machine. Moreover, many network communication protocols are best suited to the transmission of simple, linear strings of values or characters. Complex abstract data types, especially those with pointers, generally cannot be transmitted reliably over such a network in the same form used to represent the data types in memory. Also, when a pointer points to a large or complex collection of data values, such as a table of a database system, it may be impractical or inefficient to convert the entire table to a universal form for transmission over the network.

When the unpacked storage format is used in such a heterogeneous environment, objects retrieved from the database must be transported around the computing environment in object form. As a result, the objects may need to undergo transformation or conversion at each different machine.

Another problem arising in the storage of complex information objects in a database system is that database tables often have a maximum column size that is well below the amount of storage needed to store an attribute of an object. For example, one known database allows a maximum of 4096 bytes to be stored in a single column of a database table. Complex information objects often have attributes that are far larger than this, such as nested tables or arrays of a megabyte or more in size.

Maintaining the state of objects during the interval between successive executions of a program that uses the objects, known as object persistence, is another problem that arises in using computer programs that create complex information objects. When a large, complicated program runs, it creates numerous inter-related objects in main memory. If the main memory becomes full, some of the objects must be extinguished, or temporarily stored using a non-volatile storage device such as a disk storage device. This is known as a virtual memory approach. Another approach for using large objects in systems with limited volatile memory is to store a "graph" or description of the objects and their interrelationships, and re-create the objects when needed. Either approach causes degradation in program performance because of the relatively slow response time of disk storage devices. In addition, neither approach provides a way to permanently save the state of the objects, because the approaches are intended only to store objects temporarily during program execution. If the program or computer system crashes, the state of the objects may be lost. This can result in catastrophic data loss.

Still another problem arising in storage of objects in databases is the representation of objects that are defined but contain no information. The Structured Query Language (SQL) used in many databases permits a "null" value to be assigned to any column that has a scalar data type. The null value indicates that the value of the column is undefined. Generally, the null value is stored in the column as a reserved bit pattern. Another approach is to store a null value or sentinel value in the column adjacent to a data value. The disadvantage of these approaches is that they remove a potentially desirable bit pattern from the set of all usable bit patterns for that column. For example, some systems define the value zero, or a negative number, as representing a null value. This is undesirable because the value used to represent null may represent a useful value for that data type, or an application program or user may need that bit pattern for a particular application.

Moreover, in this approach each data type potentially has a different bit pattern that indicates null. For example, a database can define the value −1 as null. This value can be used for columns of type Age, where Age represents a person's age in years, because a person's age is not expressed in negative integers. But if the same database has a column of type Account_Balance, representing the monetary value in an account, the value −1 is potentially needed and cannot be used to represent null. Accordingly, application programs or the database server must track all the different bit patterns that mean null, and translate such bit patterns into a null indication. This is cumbersome and error-prone. It is virtually impossible to define a reserved null value (or "sentinel value") that is usable in any data type and that is not potentially needed by any type to represent a legitimate value.

In addition, this approach is not easily adapted to columns defined to store information objects declared using complex ADTs. The traditional approach provides no way to mark the entire object as null. In previous approaches, the only way to mark an object as null is to store a null value in each attribute of the object. When such an object is retrieved, the retrieving process must check each attribute for a null value and can conclude that the object is null only if all attributes are set to null. This is slow and inefficient.

Further, it is desirable to retain the ability to apply queries in the Structured Query Language (SQL) to objects that are stored in a database. Past object storage approaches have been best suited for use in conventional computer programming environments in which a program or compiler is accessing the stored objects. These approaches have not provided a way in which stored objects can be queried and processed using SQL.

Thus, there is a need for a system or process that permits complex information objects to be stored efficiently in a table of a database system.

There is also a need for a system or process that permits complex information objects to be retrieved efficiently from a table of a database system without unnecessary operations to reconstruct the object.

There is a need for a system or process that can enable storage of complex information objects in database table columns that have limited size.

There is also a need for a system or process that can efficiently store null values in information objects defined by complex abstract data types, and that are stored in columns of a database table.

There is also a need for a system that supports performing SQL operations on objects stored in a database in these forms.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In one aspect, the invention encompasses a method of storing an information object in a table of a database system, the table comprising an array of rows and columns, the method comprising the steps of pickling the information object into a first linearized representation of the information object; and storing the first linearized representation in one of the columns.

One feature of this aspect is that the pickling step comprises the steps of receiving first metadata that describes the information object; and providing the first metadata to a pickling process that pickles the information object into the first linearized representation of the information object. Another feature is the step of receiving second metadata that describes a format of the columns and a position in one of the columns of an attribute of the information object. Still another feature is the step of allocating storage for the first linearized representation of the information object.

Yet another feature is that the step of allocating storage comprises the steps of receiving an estimated storage size of the information object; and allocating contiguous main memory in an amount approximately equal to the estimated storage size. According to another feature, the step of allocating storage comprises the steps of receiving an estimated storage size of the information object; and allocating virtual memory in an amount approximately equal to the estimated storage size.

A further feature is that the step of allocating storage comprises the steps of receiving an estimated storage size of the information object; and allocating a binary object having an object size in bytes approximately equal to the estimated storage size. Another feature is the steps of allocating memory storage for the first linearized representation of the information object; storing in memory a null object associated with the information object and comprising information indicating whether the information object and the attribute thereof has a null value; and storing a value of the attribute of the information object in the linearized representation when a corresponding attribute of the null object indicates that the attribute of the information object is valid.

According to another feature, the method includes the steps of receiving an identifier of the attribute of the information object for which a value is to be retrieved; testing a null object associated with the information object and comprising information indicating whether the information object and the attribute thereof has a null value to determine whether the attribute is null; and retrieving the value when the null object indicates that the attribute has a value. Another feature involves the steps of receiving an identifier of the attribute of the information object to be modified and a modification value; testing whether the information object is stored in the column in an unpacked format; testing a null object associated with the information object and comprising information indicating whether the information object and the attribute has a null value to determine whether the attribute is null; and storing the modification value in the column when the information object is stored in the unpacked format and when the null object indicates that the information object contains information.

Still another feature is the steps of receiving, in the first metadata, information identifying a comparison routine configured to compare the information object and a second information object; invoking the comparison routine; and receiving a result value from the comparison routine that indicates whether the information object matches the second information object. Another feature is includes the steps of identifying a plurality of attributes of the information object; associating each of the plurality of attributes with a portion of the image; and storing each portion of the image in a separate one of the columns of the database.

In other aspects, the invention provides methods and processes for accessing and modifying information objects that are stored in a linearized form, and for transferring such objects across client/server boundaries.

In other aspects, the invention encompasses an apparatus, computer program product, and computer data signal embodied in a carrier wave that embody the foregoing mechanisms and steps.

BRIEF DESCRIPTION OF THE DRAWINGS

The present invention is illustrated by way of example, and not by way of limitation, in the figures of the accompanying drawings in which like reference numerals refer to similar elements and in which:

FIG. 1A is a diagram of a memory representation of an information object.

FIG. 1B is a diagram of the information object of FIG. 1A represented in a pickled image.

FIG. 2A is a diagram of the image of FIG. 1B stored in a packed format table.

FIG. 2B is a diagram of the image of FIG. 1B stored in an unpacked or exploded format table.

DETAILED DESCRIPTION OF THE PREFERRED EMBODIMENT

Figure 3A:
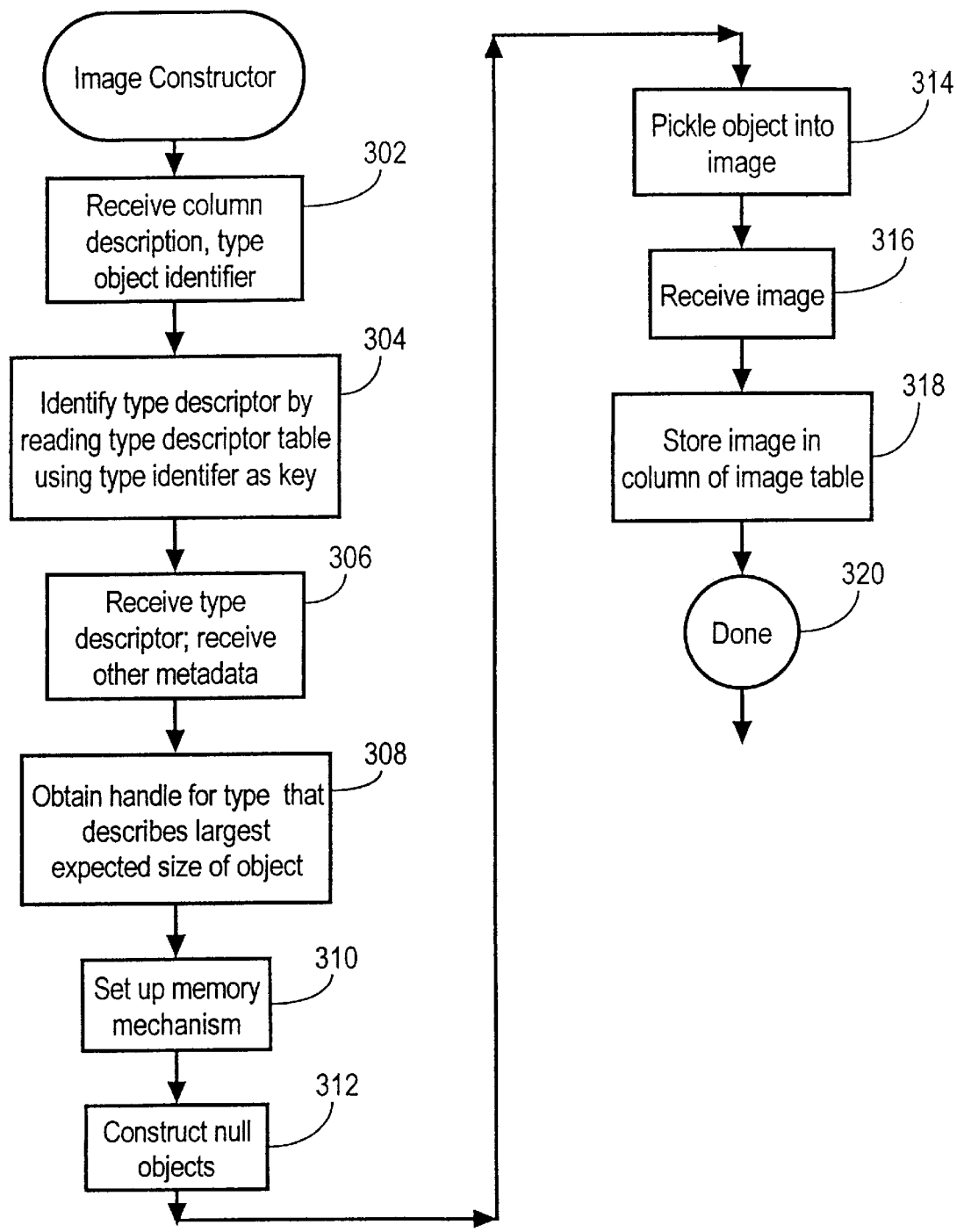
FIG. 3A is a flow diagram of an image constructor process.

A method and apparatus for storage and use of information objects using a database is described. In the following description, for the purposes of explanation, numerous specific details are set forth in order to provide a thorough understanding of the present invention. It will be apparent, however, to one skilled in the art that the present invention may be practiced without the specific details. In other instances, well-known structures and devices are shown in block diagram form in order to avoid unnecessarily obscuring the present invention.

Representation of Complex Information Objects

In one aspect, the invention relates to storing information, such as data objects, in a database system. According to the invention, data objects that are defined by complex abstract data types are stored in a database system in either a packed format or an unpacked format. The process of transforming an object from its native format into a packed format is called pickling the object into an image. An object that is stored in an unpacked format is said to be unpickled.

For example, a data object is defined by the complex abstract data type Employee that is shown in Table 1.

TABLE 1

ADT <EMPLOYEE>

```
struct Employee {
    char[20] Name;
    Date Hired;
    *Employee [1..Max_Supes] Supervises;
    *Dept_Name Department;
    int Salary;
    char[16] Position;
    int Employee_Number
}
```

The ADT of Table 1 describes a hypothetical employee of a company and is therefore named Employee. Objects of type Employee have a Name attribute that stores the employee's name as a string of up to 20 characters. The Hired attribute is defined as type Date; the example presumes that the programmer has previously defined type Date to store calendar dates and that type Date is a character string type. The Supervises attribute defines other employees who are supervised by this employee. The Supervises attribute is an example of what is referred to in this context as a circular reference; it is an array of pointers to objects of type Employee. The Department attribute is a pointer to a department name of the type called Dept_Names. The Salary attribute is an integer that stores the employee's annual salary. The Position attribute is a character string that stores a description of the employee's job. The Employee_ Number attribute is an integer that stores a unique employee number for identifying the employee.

FIG. 1A is a diagram of how an Employee object 10 can be represented in computer memory. As an example, the starting address of the object 10 is designated as hexadecimal 2A22. Characters forming the Name attribute 12 are stored sequentially beginning at the starting address, padded with null bytes. The Hired attribute 14 is also stored as a string of characters.

The Supervises attribute 16 is stored in the form of an array of four-byte physical memory address pointers. The number of pointers in the array is given by the value of Max_Supes, which is assumed to be a constant or variable defined and assigned a value earlier in the program. In the example of FIG. 1A, Max_Supes is assumed to have a value of five, and five pointers 16a, 16b, 16c, 16d, 16e are stored in the ADT 10.

The first pointer 16a of the Supervises attribute 16 has a value of hexadecimal 2F0C. A set of data values 10' resides at that memory address. Since the Supervises attribute 16 is defined in Table 1 as an array of pointers to Employee objects, each of the data values 10' represents another Employee object. For clarity, only the employee Name attribute 12' is shown. The Name attribute 12' is followed by the other attributes of the pointed-to Employee object that are defined in Table 1.

The Department attribute 18 is also stored as a four-byte pointer to a department data value 18'. In the example of FIG. 1A, the Department attribute 18 has a value of 3230, and at that memory address, the department data value 18' is shown as a 24-byte string. The Salary attribute 20 is stored as a four-byte integer. The Position attribute 22 is stored as a character string padded with null bytes. The Employee_ Number attribute 24 is stored as a four-byte integer.

Because of the presence of physical pointers such as the Supervises attribute 16 and the Department attribute 18, the Employee object 10 is not easily stored, transported to another computer or across a network. When the Employee object is retrieved later after storage, or when it arrives at a remote computer system, the physical addresses represented by the pointers will no longer be valid. It is not practical to translate the pointers into valid addresses upon retrieval, or upon arrival at the destination system. Accordingly, and in the preferred embodiment, the Employee object is pickled into an address-independent pickled image before it is transported. In a pickled image representation, attributes of an object are linearized into a string of bytes, and physical pointers are converted ("swizzled") into logical pointers. Pickling and unpickling objects is disclosed in co-pending U.S. patent application Ser. No. 08/961,795, filed Oct. 31, 1997, entitled "Apparatus and Method for Pickling Data," pending, the disclosure of which is hereby incorporated by reference as if fully set forth herein.

FIG. 1B shows a pickled image 30 of the object 10 of FIG. 1A. The image 30 has a prefix segment 31 that contains control information, such as the length of the image, and flags indicating the form of data representation to be used when unpickling the image. The image 30 has a data segment 33 that contains linearized data from the object 10. Each attribute of the object 10 forms a part of the data segment 33, but all attributes are represented in unformatted strings of bytes that are canonical. The term "canonical" in this context means in a uniform representation. For example, the Name attribute 12 is stored in the image 30 as a linear string of bytes. Machine-dependent representation information, such as the character set used for the character data that forms the Name attribute 12, is not stored in the pickled image 30. The Date attribute 14 is similarly stored as a string of bytes.

Physical pointers of the object 10 are converted to logical pointers and a string of bytes of the pointed-to data. For example, the first physical pointer 16a of the object 10 is stored a logical pointer 32, a length value 34, and a string 10' of the data pointed to by the physical pointer 16a. The logical pointer 32 has the value "78" because the length value 34 is located at an offset of 78 bytes from the start of the data segment 33. Logical pointers, length values, and data for the other physical pointers 16b, 16c, 16d, and 16e of FIG. 1A are omitted from FIG. 1B for clarity.

The Department attribute 18 of object 10, which attribute also is a pointer, similarly is stored as a logical pointer 36, a length value 34, and Department data 18'. The logical pointer 36 has a value of "115" that indicates that the length value 34 is located at an offset of 115 bytes from the start of the data segment. Preferably the logical pointers and length values are stored in the image as integers in a uniform, canonical representation, such as four-byte integers. The format of such numeric values is specified in the prefix segment 31. Also, in this arrangement, the relative location of the logical pointers in the image 30 is the same as the relative location of the physical pointers in the object 10 of FIG. 1A.

Storage of Pickled Images

According to the invention, objects are stored in a database table in the form of pickled images. In one embodiment, an entire image is stored in a single column of a database table. In another embodiment, each portion of a pickled image that corresponds to an attribute of an object is stored in a separate column of a database table.

FIG. 2A shows a database table 40 having first and second rows 42a, 42b, and a RowID column 44, OID column 46, and Image column 48. Images 30, 30' of information objects are stored in the Image column 48 of rows 42a, 42b, respectively. The OID column 46 stores an object identifier value, which is a unique number associated with the information object corresponding to the image that is stored in the Image column 48. The RowID column 44 stores a row identifier value, which is a unique number associated with a row. In the preferred embodiment, the RowID column 44 and the OID column 46, and their values, are hidden from end users. Their values are used by application developers and by the database system to locate, retrieve, and manipulate images.

By way of example, the database table 40 can be a table in a database system such as the Oracle8 database system commercially available from Oracle Corporation, Redwood Shores, Calif.

An entire image 30 of an information object 10 is stored in a single column of a database table, for example, the Image column 48. In this way, an information object 10 that is defined by a complex abstract data type is conceptually "flattened" and stored in a manner that can be rapidly and efficiently manipulated using existing functions of the database system or server. The image 30 can be copied or moved among distributed database systems or machines without intermediate transformations of the format, representation, or alignment of the image. Accordingly, an application program which uses the database system can be written in terms of complex abstract data types, but information objects instantiated from such abstract data types can be stored in a database and thereby take advantage of fast, efficient database operations.

FIG. 2B shows an alternate way to store an image 30 of an information object 10 in a database table 50. The table 50 has a RowID column 44 and an OID column 46 that store values in the same manner discussed above in connection with FIG. 2A. The prefix segment 31 is stored in a Prefix column 52. The table 50 also has separate data columns 54, 56, and 58, each of which stores a portion of the data segment 33 of the image 30 corresponding to an attribute of the ADT that defines the information object 10. A first portion 60a of the image 30 that corresponds to the Name attribute of the object 10 is stored in a first attribute column 54. A second portion 60b of the image 30, corresponding to the Date attribute of the object 10, is stored in the second attribute column 56 of the table 50.

This arrangement, in which each attribute of the information object's ADT is represented in a separate database column, is called an "exploded" or "unpacked" object storage format. Using this arrangement, data for individual attributes of the ADT of an object 10 are rapidly accessible by retrieving the column of the database that corresponds to the attribute. This facilitates rapid retrieval of values for one or a range of attributes from within an image of a complex information object. Also, existing database operations, such as complex queries, can be applied to attributes of an information object, freeing the application programmer from having to write custom code to carry out such operations.

In this arrangement, when an information object 10 contains physical pointers such as the pointer 16a, the corresponding logical pointer 32 and length value 34 of the image 30 are not stored in the database table. As shown in FIG. 2B, the third attribute column 58 stores only the value 60c that is pointed to by such a physical pointer. Storing a logical pointer or length value is not necessary because the location of the attribute in the table, and the length of the column, are managed internally by the database system as discussed below.

An application program that makes use of the foregoing arrangements can select the packed format shown in FIG. 2A or the unpacked, exploded format shown in FIG. 2B for any information object defined in, instantiated in, or used by the application program. In one embodiment, the application program declares the storage format when the ADT of the information object is declared, so that selection of the packed or unpacked format is carried out when the application program is compiled. The storage format also can be defined when tables that use the information objects are defined in the application program.

In the preferred embodiment, all information objects are stored in the unpacked, exploded arrangement, but arrays are always stored in the packed format.

Metadata for Use in Accessing Stored Images

When the packed image storage arrangement of FIG. 2A is used, special measures must be taken to enable an application program to locate, load values from, and store values in individual attributes of an information object represented by the image. Accordingly, for this purpose, the invention encompasses a set of image attribute manipulation mechanisms. In this discussion, the database tables 40, 50 of FIG. 2A and FIG. 2B will be called "image tables."

To support the image attribute manipulation mechanisms, metadata is stored and managed. The metadata includes a System Column table and a System Column Type table stored in a database having the columns shown in Tables 2A and 2B, respectively:

TABLE 2A

SYSTEM COLUMN TABLE

| | |
|---|---|
| col_id | Column identifier |
| col_pos | Column position |
| table_number | |

TABLE 2B

SYSTEM COLUMN TYPE TABLE

| | |
|---|---|
| col_type_id | Type object identifier (TOID) |
| packed flag | |
| mapping vector | |

TABLE 2B-continued

SYSTEM COLUMN TYPE TABLE

| | |
|---|---|
| table_id | Table identifier |
| col_id | Column identifier |

The System Column table describes information stored in the image database table, which may be in the form of database table 40 of FIG. 2A or database table 50 of FIG. 2B. The col_id column stores a value that uniquely identifies a column in the image table. For example, in one embodiment, the col_id column stores a unique integer that identifies a column in the image table. The col_pos column stores an integer that uniquely identifies the position of the column within the image table. For example, if the column identified by the col_id is the third column in the image table, the value of the col_pos column would be 3. Thus, columns in the image table are ordered and numbered in ascending order starting from 1.

The table_number column stores a value that identifies the image table. In the preferred embodiment, each table in the database system has a unique table identifier. The value of the table identifier for the image table is stored in the table_number column of the System Column table.

In the System Column Type table, shown in Table 2B, the col_type_id column stores a value that identifies the data type of the column. In the preferred embodiment, every data type recognized by the database system has a unique type identifier. A separate table maps type identifiers to descriptions of data types.

The packed flag indicates whether objects stored in the column in the image table are stored in packed, pickled format or unpacked, exploded format. Preferably the packed flag stores a Boolean value in which TRUE indicates packed, pickled format.

The metadata also includes a Type Descriptor Object that stores information describing each ADT. In the preferred embodiment, the Type Descriptor Object has a set of attributes that store the values shown below in Table 2C.

TABLE 2C

TDO ATTRIBUTES

| ATTRIBUTE | CONTENTS |
|---|---|
| Type name | Name of the ADT represented by the TDO |
| TOID | Identifier corresponding to the type |
| ADD array | Array of Attribute Descriptor Objects |
| TDS | Type Descriptor Segment |

Each Attribute Descriptor Object is a data structure comprising attributes that store information about each attribute in the type represented by the TDO. This information includes, for each attribute, a unique identifier; a name; and an identifier of its type. Type Descriptor Objects are mapped to type identifiers (TOIDs) in a system table called, in an embodiment, Kottd$. Type names are mapped to type identifiers in an object system table called, in one embodiment, Obj$.

The TDS is fully described in the above-referenced co-pending U.S. patent application which has been incorporated by reference. The Type Descriptor Segment has a variable length, and stores a Length field that holds a numeric value that identifies the length in bytes of the remainder of the Type Descriptor Segment. A Version No field stores a value uniquely identifying the format of the Type Descriptor Segment. The Version No field enables the format of a TDS to be changed without adversely affecting operation of a program that uses the TDS. By reading the Version No field, the pickling mechanism can determine whether the TDS has changed since the last access. The Type Descriptor Segment also has a Number Of ADTs field that stores the number of abstract data types represented in the remainder of the TDS. A Number Of Attributes field stores the total number of attributes of all the ADTs stored in the Type Descriptor Segment. The Number Of ADTs field and the Number Of Attributes field are used to calculate the locations in the Type Descriptor Segment of different ADTs and their attributes.

The Type Descriptor Segment may also store zero or more ADT definitions. Each ADT definition stores an ADT Number that contains a unique identifier for the ADT that is represented by the ADT definition. Preferably the ADT Number is a two-byte value that corresponds to a name of the ADT that is defined in a declaration of the ADT in the source code of an application program. The ADT definition also stores an index pointer that indicates the number of bytes from the beginning of the ADT definition to an index definition that is associated with the ADT definition. The ADT definition also stores information that describes the ADT associated with the ADT definition, in the form of identifiers and opcodes associated with the ADTs. In this way, a Type Descriptor Segment conceptually "flattens out" or "flattens" a complex ADT into a linear string of opcodes that define the ADT.

Each index definition of the TDS stores one or more attribute offsets. Each attribute offset stores a value indicating the offset in bytes from the beginning of the Type Descriptor Segment to one attribute of the ADT stored in the ADT definition. Using the attribute offsets in the index definitions, the processes described herein can rapidly locate a particular attribute of an abstract data type.

First and second Inheritance Flags indicate whether the ADT that is described by the Type Descriptor Segment has certain inheritance characteristics. For example, the Inheritance Flags store Boolean values that indicate whether the ADT can inherit other ADTs, and whether the ADT described by the Type Descriptor Segment might contain inheritance pointers. The Type Descriptor Segment also stores Attribute Character Set information that enables the TDS to support multiple character sets.

Memory Stream Mechanisms

Operation of the image accessor and constructor functions is facilitated by the use of certain memory stream mechanisms, preferably comprising sets of data structures and processes, which support large image storage. The memory stream mechanisms form a part of an operating context of the invention.

Preferably, three memory mechanisms are available. First, objects and images can be stored in contiguous or real memory of the client or server on which the image accessor or constructor functions are executed. Second, a mechanism providing segmented or virtual memory, whereby objects are temporarily written ("paged") to a non-volatile storage device such as a disk, is provided. This mechanism is preferred for manipulation of objects too large to fit in real memory. Third, a file-oriented memory mechanism is preferred for manipulation of exceptionally large objects. Such objects are stored in a non-volatile storage device, and portions of them are retrieved sequentially in blocks as needed, in a manner similar to that used to process sequential-record files. In one embodiment, the file-oriented memory mechanism is implemented by storing the information objects in Large Objects (LOBs). The LOBs are managed by the database server. Using this mechanism, a database server can provide a sequential file abstraction to an application program that is using information objects.

Preferably, the use of one or more of these memory mechanisms is transparent to the user; and one or more of the mechanisms is selected automatically.

Image Manipulation Mechanisms

The preferred embodiment of the invention includes mechanisms for manipulating images. In one embodiment, the mechanisms are implemented as computer program functions or processes. These functions are classified as an Accessor function, Constructor function, Modifier function, and Comparison function. The functions can be called recursively from an application program.

Image Constructor Mechanism

FIG. 3A shows an image Constructor mechanism in the form of a process. The process can be implemented as a computer program function. The image Constructor mechanism is used for storing an object in packed form in a column of an image table. The image Constructor mechanism is used when an object has been instantiated from an ADT, but not yet converted into a pickled image or stored in the image table.

In one embodiment, in step 302, from the System Column table, the process receives a description of the column in which the image is to be stored. When the process is implemented as a computer program function, the description is received by passing a parameter to the process from an application program that calls the process. The process also receives a type object identifier or TOID that describes the type of the object. Preferably, the TOID is received as a parameter from the calling application program.

In step 304, the process identifies metadata describing the type of the object, such as a Type Descriptor Segment. This is done by looking up the Type Descriptor Segment in a database table, such as the Type Descriptor Object table, using the TOID as a key. When the Type Descriptor Segment is located, it is received in step 306, for example, by retrieving it from the Type Descriptor Object table. At this point the process also receives metadata used in pickling an image, such as the format description and location description metadata described in the above-referenced co-pending U.S. patent application. Thus, the process receives information sufficient to describe the column in which the image will be stored, the ADT of the object, and the format of the object and the image.

Steps 308 and 310 relate to establishing a memory mechanism for use in storing the image. It is preferable to set up the memory mechanism before invoking the pickier, so that when it is invoked, the pickier can immediately write bytes to memory. In step 308, the amount of memory needed for the image is determined. This is done by obtaining a handle, which is defined for each ADT when it is created and which describes the largest expected size of the object in bytes. If the handle indicates that the object potentially is very large, the large object type or sequential file type memory mechanism is used; if the object is medium size, the virtual memory mechanism is used; if the object is small, the contiguous memory or real memory mechanism is used. When the potential size of the object is determined, a memory mechanism is selected and set up in step 310.

In step 312, the process constructs a null object in memory that corresponds to the ADT of the object to be pickled. Construction and use of null objects is described further below.

In step 314, the process pickles the object into an image, using the metadata received in the preceding steps, and preferably according as described in the above-referenced co-pending U.S. patent application. In one embodiment, pickling is accomplished by calling a set function of a pickier program from within the Constructor mechanism. In step 316, the pickled image is received by the Constructor mechanism. Preferably, when the pickier function completes execution, it returns the pickled image to the Constructor mechanism as a parameter. In step 318, the image is stored in the previously designated column of the image table. The Constructor mechanism is complete at step 320.

Image Accessor Mechanism

Figure 3B:
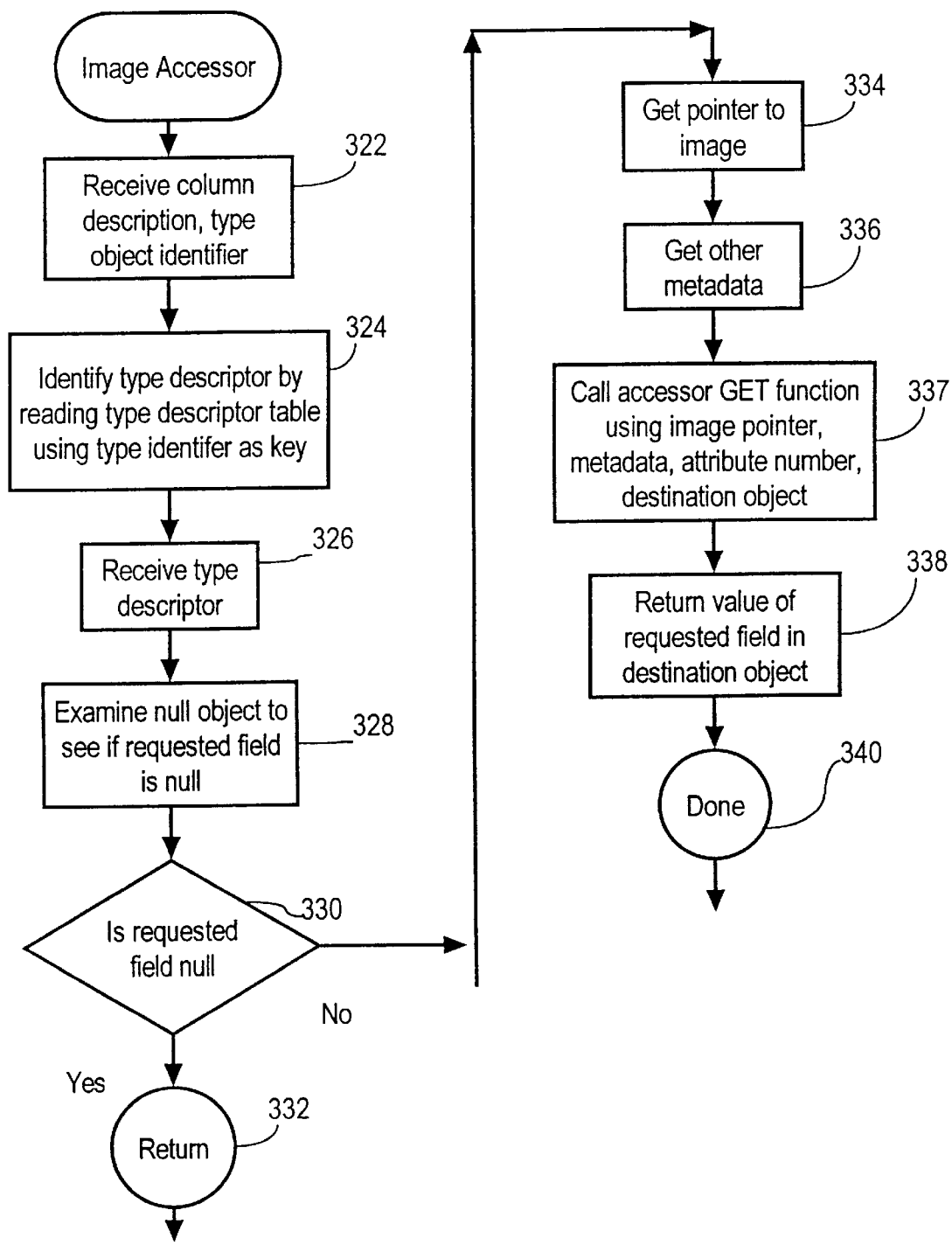
FIG. 3B is a flow diagram of an image accessor process.

An image Accessor mechanism is used to retrieve a packed image from the image table. An example of an operation requiring use of an image Accessor mechanism is the SQL statement SELECT FROM Employee WHEN E.empaddr.City=Redwood Shores. This requires access to an attribute (.City) of a stored object. FIG. 3B shows an Accessor mechanism implemented as a process. Steps 322, 324, and 326 carry out functions similar to steps 302, 304, and 306 of FIG. 3A. In these steps, the Accessor process receives a column description and type object identifier, and then retrieves a type descriptor from a type descriptor table using the type identifier. The process also receives an identifier of the particular attribute of the object that the application program wishes to access. This, in combination with step 336, provides the Accessor process with metadata sufficient to invoke an unpickling mechanism, locate an attribute within the unpickled object, and return the value of the attribute to the application program that invoked the Accessor.

In step 328, the process examines the null object associated with the object to be unpickled. As described below, to improve the efficiency of Accessor and Modifier functions, a null object is instantiated for each object that is pickled. The null object stores flags that indicate whether attributes of the pickled object are storing null values. The null object enables the Accessor and Modifier functions to avoid carrying out useless steps to unpickle an object and access its attributes. Accordingly, in step 328, before the object is unpickled from the image in the image table, the null object is examined. In step 330, the corresponding attribute of the null object is tested. If the requested field or attribute is null, then control is passed to step 332 whereby the Accessor function returns control to the calling application program. Thus, if the null object indicates that the image is storing a null value, unpickling is avoided, saving process steps.

In step 334, if the requested attribute is not storing a null value, then the Accessor process receives a pointer to the pickled image of the object, for example, by retrieving it from the image table. In step 336, the process retrieves other metadata relating to the object being accessed. In one embodiment, the process obtains a type descriptor segment and location descriptor segment for the ADT of the attribute to be accessed. This is done by retrieving the object type from the system columns table; retrieving the type identifier from the column type table using the object type as a key; fetching a type descriptor object from a table of TDOs using the type identifier as a key; unpickling the TDO, yielding a type descriptor segment and other metadata; and using the known attribute name (".city") to extract information about that attribute from the type descriptor segment. Preferably, this is done by calling a get function of a pickier program, and is carried out according to the unpickling processes described in the above-referenced U.S. patent application. In response, the pickier returns an unpickled object to the Accessor process. In step 338, the selected attribute is located in the unpickled object, and its value is retrieved. The Accessor process is complete at step 340.

Image Modifier Mechanism

Figure 3C:
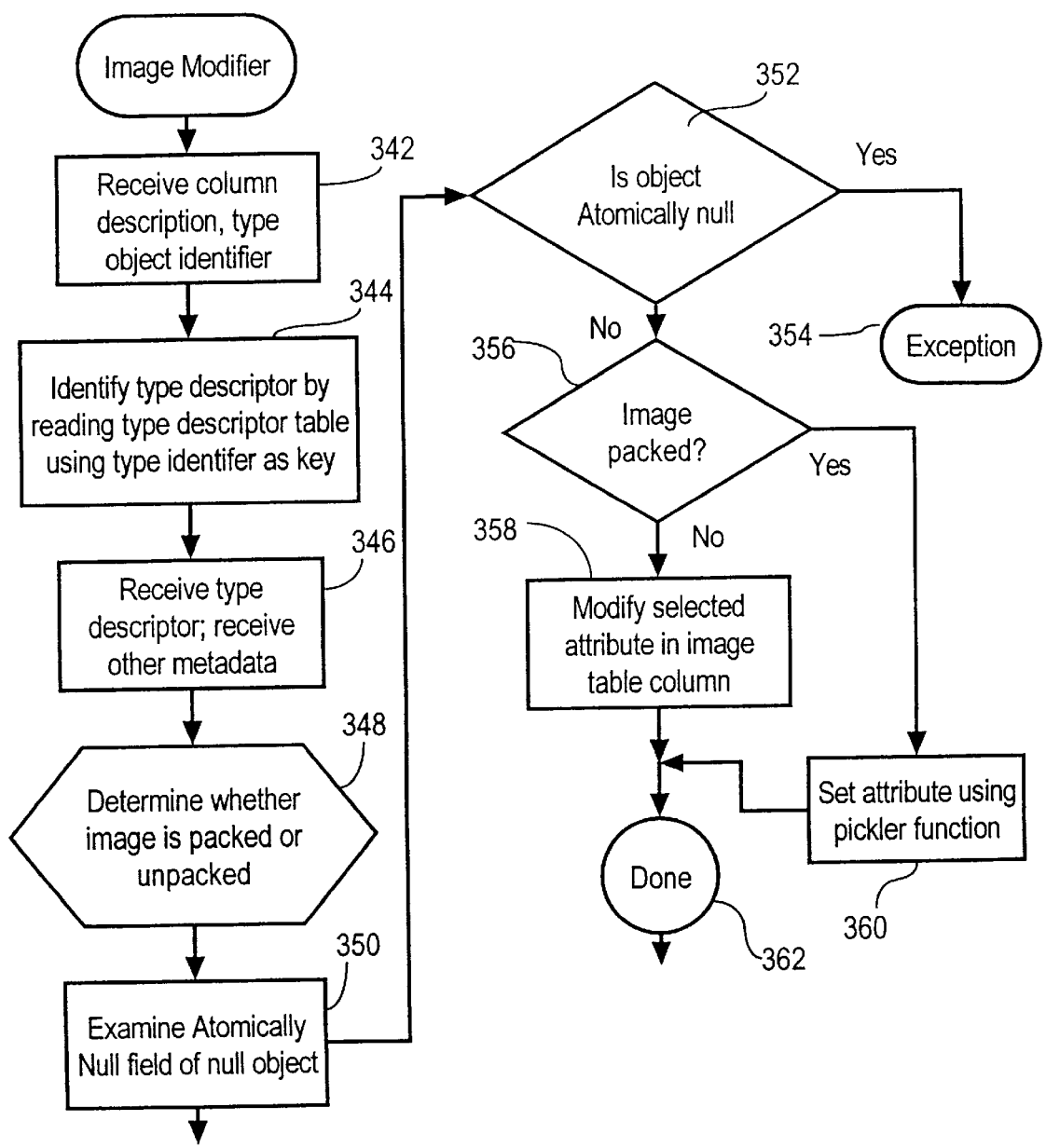
FIG. 3C is a flow diagram of an image modifier process.

The invention includes an image Modifier mechanism whereby a single attribute within a pickled image can be modified without unpickling the image and reconstructing an object in memory. FIG. 3C is a flow diagram of an image Modifier mechanism implemented as a process.

Steps 342, 344, and 346 of FIG. 3C carry out processes similar to those discussed above in connection with steps 302, 304, and 306 of FIG. 3A. Thus, in steps 342–346, the Modifier process receives a column description and a type object identifier for the type of the object to be modified. Using the type object identifier, type descriptor metadata is retrieved from a type descriptor table. In step 346 the process also receives information identifying the attribute of the object that is to be modified, and a value which is to be placed in that attribute.

In step 348, the process determines whether the image is stored in the image table in unpacked or packed format. Preferably, this is done by examining the packed flag in the System Column table.

In step 350, the process examines the null object associated with the object to be modified to determine whether the object is atomically null. In this context, "atomically null" means that the entire object has been set to a null value; the values of individual attributes within the object are unknown and are ignored. If the object is atomically null, as tested in step 352, then an exception is raised in step 354. No modification of the object is permitted, and the Modification process is discontinued.

If the image is not atomically null, then control passes to step 356, in which the process tests whether the image is stored in packed format in the image table. If the image is not stored in packed format, then in step 358, the process locates the column of the image table that stores the selected attribute. The column is modified by writing the new value into it. Thus, a selected attribute of an image is modified, without unpickling or reconstructing the image into an object, based upon the metadata received by the Modifier function.

If the image is stored in packed format in the image table, then control is passed to step 360. The attribute is set by using an external function or process provided in the pickier. For example, in the preferred embodiment the pickier has a set function that is called with appropriate parameters, such as the attribute number and value. The pickier function will retrieve the image from the image table, locate the selected attribute in the image using the metadata, and modify the value stored at that position in the image. Modifier processing concludes at step 362.

Image Comparison Mechanism

Figure 3D:
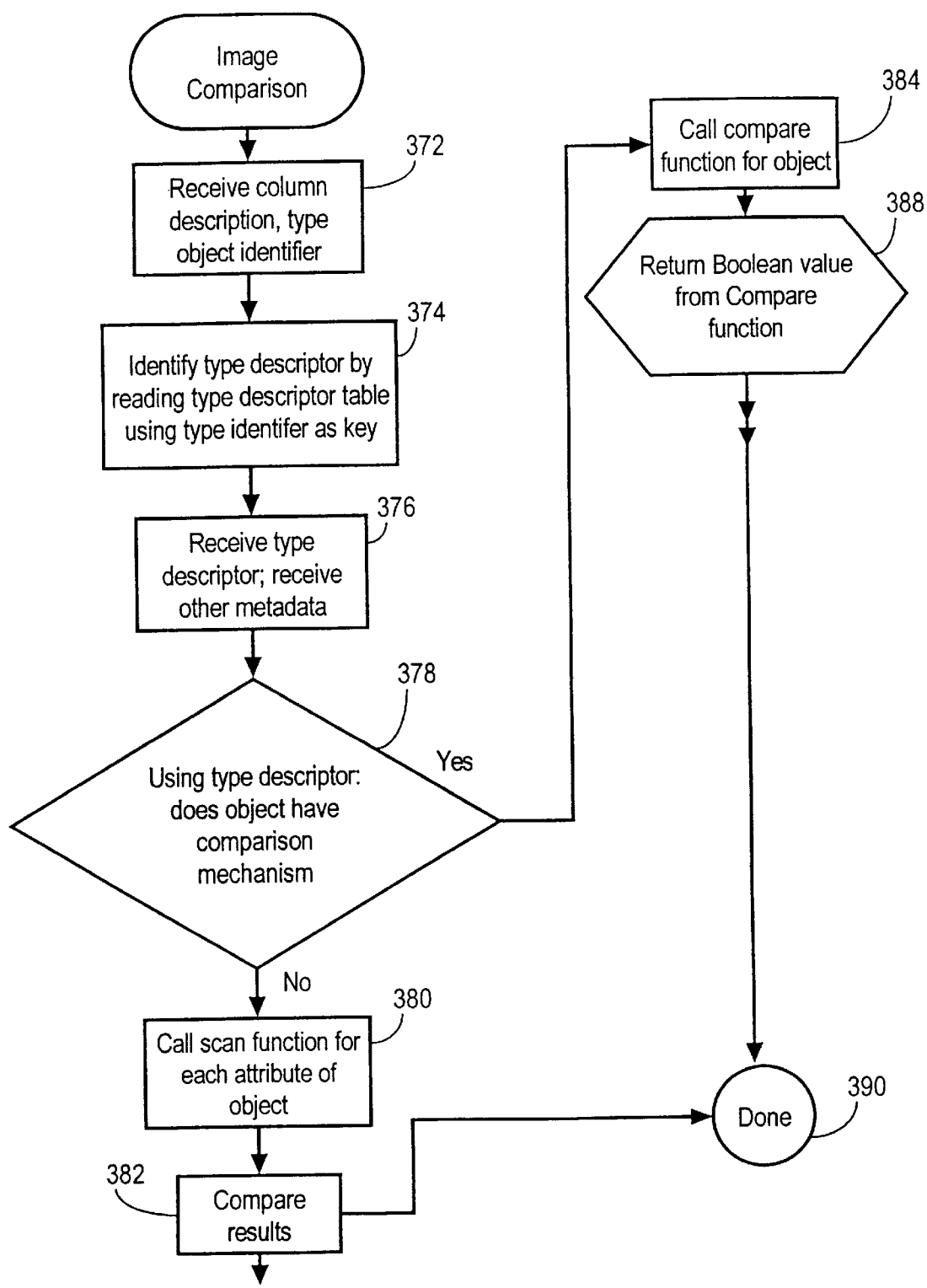
FIG. 3D is a flow diagram of an image comparison process.

The invention further encompasses a Comparison mechanism whereby two images can be compared. Preferably, the Comparison is invoked automatically by the database system when it detects that two objects are being compared and that the objects have been pickled into images. FIG. 3D shows a Comparison mechanism in the form of a process.

In steps 372, 374, and 376, the Comparison mechanism carries out processes similar to those discussed above in connection with steps 302, 304, and 306 of FIG. 3A. Thus, in steps 372–376, the Comparison process receives a column description and a type object identifier for the type of the object to be compared. Using the type object identifier, type descriptor metadata is retrieved from a type descriptor table. In step 376 the process also receives information identifying the attribute of the object that is to be modified, and a value which is to be placed in that attribute.

The Comparison process also receives identifiers for the two objects to be compared. Preferably these are unique object identifiers. When the object identifiers are received, the image table is searched to locate rows containing images for the selected objects.

In step 378, the Comparison process determines whether the application program has supplied a comparison method for objects of the type identified by the type descriptor. An application program can define a comparison method in any desired terms. Generally the comparison function is provided in the form of a map method that takes an object identifier as a parameter, and returns a scalar value that is a hash of the object's value. If such a comparison function is present, in step 384 the Comparison process calls the comparison function for the object. The objects to be compared are passed to the Comparison function in pickled form. The value returned by the comparison function is returned by the Comparison function to the application program that called it in block 388.

In an alternative embodiment, the Comparison mechanism is invoked at the time that an application program is compiled. Code is generated to carry out steps 384 to 388, including a call to the user-defined comparison function.

If the application program does not include a comparison function, then in step 380, the Comparison mechanism invokes a function of the pickler (or generates code to do so) to scan attributes of the image. Preferably, the pickier provides a scan function that can locate an attribute at a particular position within an image, scan each byte of the attribute, and return a hash value or other value describing the value. In step 380, the scan function is successively called for each attribute within the image of the object to be compared. The Comparison mechanism returns a TRUE value only if the scan function returns the same value for all attributes of the images of the objects to be compared.

Storing Null Objects in a Database System

Generally each attribute of an information object can be set to a value within a range defined by the type of the attribute. For example, an attribute of type "unsigned integer" can be set to any value within the range of zero to the maximum integer that can be represented by the machine hardware, such as $2^{16}$. Each attribute also can be set to a "null" value that indicates that the actual value of the attribute is undefined. A null value is distinct from zero and any other valid attribute value.

Traditionally, a null value is stored in an attribute using a reserved or sentinel value. For example, in an unsigned integer stored in four bytes, the binary value 11111111111111111111 might represent null. This approach has the disadvantage that the sentinel value used to represent null cannot be used for any other purpose. It is possible, for example, that the binary value 11111111111111111111 might be needed to represent a useful numeric value. However, because it is defined as null, it is unavailable for use as a substantive value. It would be advantageous to store null values without removing a sentinel value from the set of valid attribute values.

Also, when information objects are stored in a database in the form of a pickled image, and the entire object or a selected attribute is storing a null value, it is inefficient to retrieve an image and unpickle it for use by an application program. In many cases, an attribute or object having a null value cannot be used in subsequent program operations. Therefore, it would be useful to have a way to identify a null value of an attribute or object without carrying out needless machine operations in retrieving and unpickling the object.

To overcome these problems, the invention encompasses construction of null objects that are created and maintained in parallel with or in association with a real information-bearing object. A null object has the same number of attributes, ordered in the same position, as a corresponding information-bearing object. Each null object attribute can be set to one of three values. A first value indicates that the corresponding attribute of the information-bearing object is null. A second value indicates that the corresponding attribute is not null. A third value called "not nullable" or "bad null" indicates that the corresponding attribute is not capable of being set to a any value.

The third value is used, for example, when an attribute of the information-bearing object has a parent attribute, and child attributes that are dependent, for a valid value, on the parent attribute. If the parent attribute is null, the child attributes automatically are set to "not nullable" to indicate that they cannot be used or manipulated. In this way, the "not nullable" value improves efficiency by allowing a test of whether an attribute is null to be resolved at the topmost parent attribute.

In the preferred embodiment, the numeric values zero, 1 and 2 are the first, second, and third values respectively.

The null object also includes an additional atomic null attribute that indicates whether the entire information object is considered set to a null value. When an object is set as atomically null, values of its attributes are ignored. The atomic null attribute is set to "null" or "not null," preferably using numeric values "0" or "1".

Figure 5:
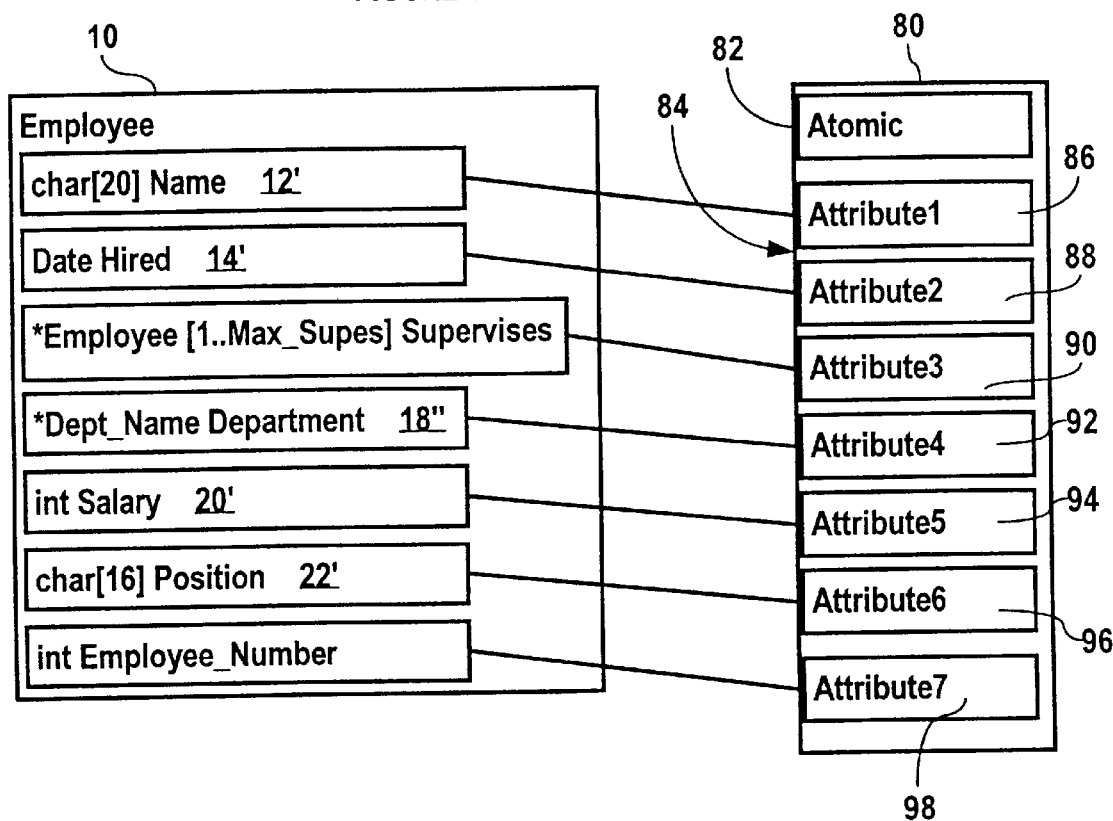
FIG. 5 is a diagram showing an information object and a null object.

FIG. 5 is a diagram of a null object 80 showing its internal structure and relationship to an information-bearing object 10. The null object 80 has an atomic null value 82 stored in association with an array of attribute null values 84. Each attribute null value in the array 84 corresponds to one of the attributes of the information object 10. For example, the first attribute null value 86 corresponds to the Name attribute 12' of the information object 10. The sixth null value 96 corresponds to the Position attribute 22'.

In the preferred embodiment, a null object is a data structure stored in memory in the form of an array of unsigned two-byte quantities. The first element of the array stores the atomic null value. The remaining elements in the array store the attribute null values. Thus the array has a length in bytes of (2+(2*the number of attributes in the ADT of the object 10)).

Preferably, when null objects are stored in a non-volatile storage device such as disk, a compressed storage format is used. In the compressed storage format, the null object is stored as an array of unsigned one-byte quantities wherein the atomic null value is stored in 2 bits, and each attribute null value is stored in 2 bits.

In operation, a null object 80 is stored in association with its corresponding information object 10 in a database table such as tables 40, 50 of FIGS. 2A, 2B. Preferably, when the image 30 of the object 10 is stored in the table in exploded form, a null object 80 is stored in pickled image form in a separate, dedicated column of the database table, such as the first column. When the object 10 is stored in packed form as an image 30, preferably the corresponding null object 80 is stored in the prefix segment 31 of the image 30.

When an information object 10 is accessed, its associated null object 80 is examined to determine whether the atomic null value indicates null. If not, and a particular attribute of the object 10 has been requested, then the corresponding attribute null value is examined to determine whether the requested attribute is null. The states of the atomic null value and the attribute null values are returned to the calling application program for further conditional action or processing.

Figure 4A:
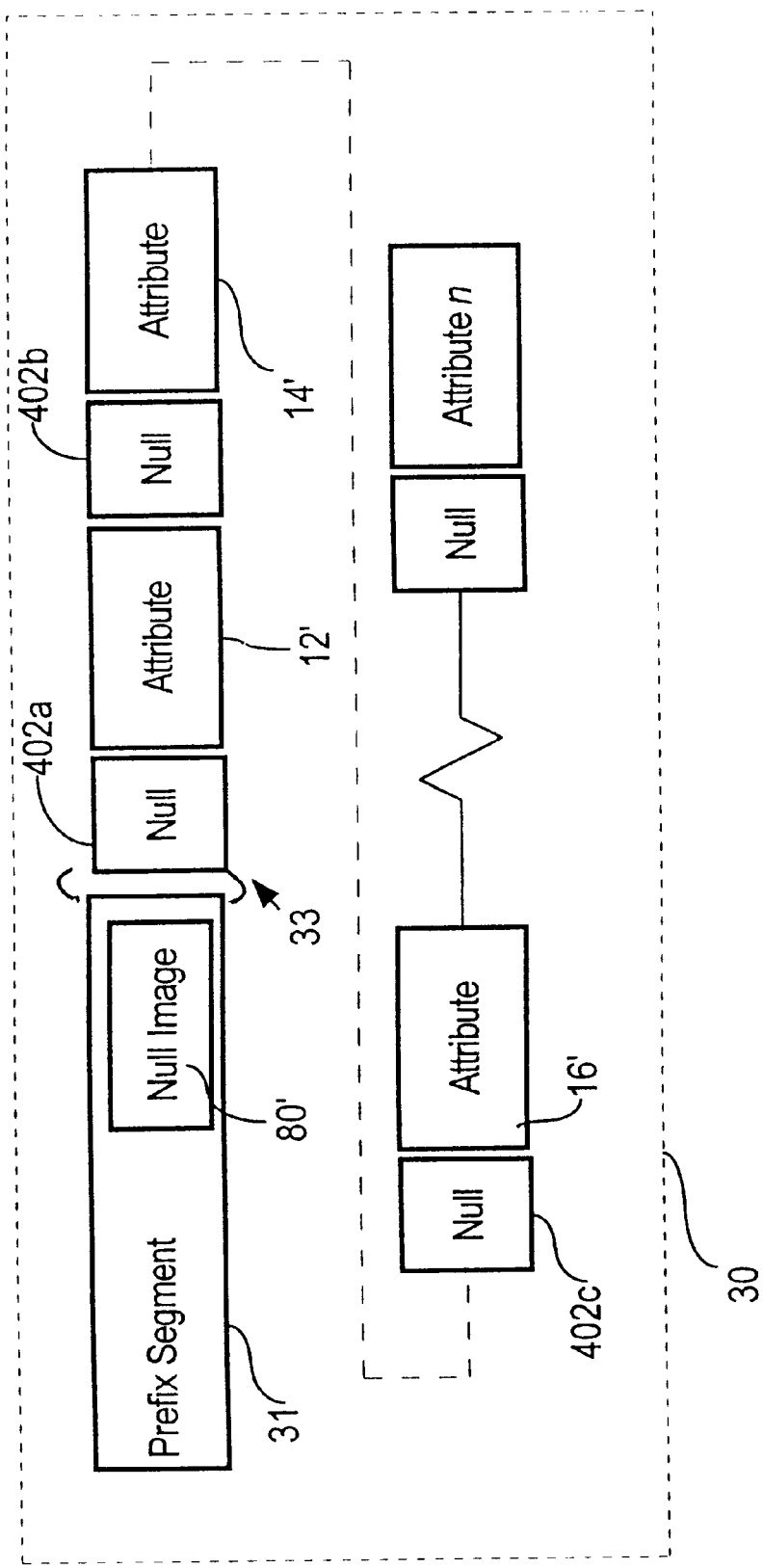
FIG. 4A is a diagram of an image having null information stored in it.

FIG. 4A is a diagram of an alternate mechanism of storing atomic and attribute null information; in a way that enables the amount of null information to be minimized. In FIG. 4A, an image 30 has a prefix segment 31 and a data segment 33. Within the prefix segment 31 is a pickled null image 80' having the structure of the null object 80 shown in FIG. 5, in linearized pickled form. Within the data segment 33 are a plurality of attribute data values 12; 14,' 16.' Stored in association with each of the attribute data values 12,' 14,' 16' are attribute null values 402a, 402b, 402c.

Each of the attribute null values 402a, 402b, 402c is uniquely associated with one of the attribute data values 12,' 14,' 16.'

Some known database servers automatically establish and store a sentinel null value in association with each column of each table in the database system. Generally, this capability is an integral part of the database server and cannot be disabled. Therefore, it is advantageous to use these column null values and avoid duplicating the information represented on the column null values in another structure such as the null object.

Accordingly, in one embodiment a method is provided for stripping a null structure, such as the null image 80' of FIG. 4A, to remove information that is duplicated in the sentinel null values, such as null values 402a–402c.

Figure 4B:
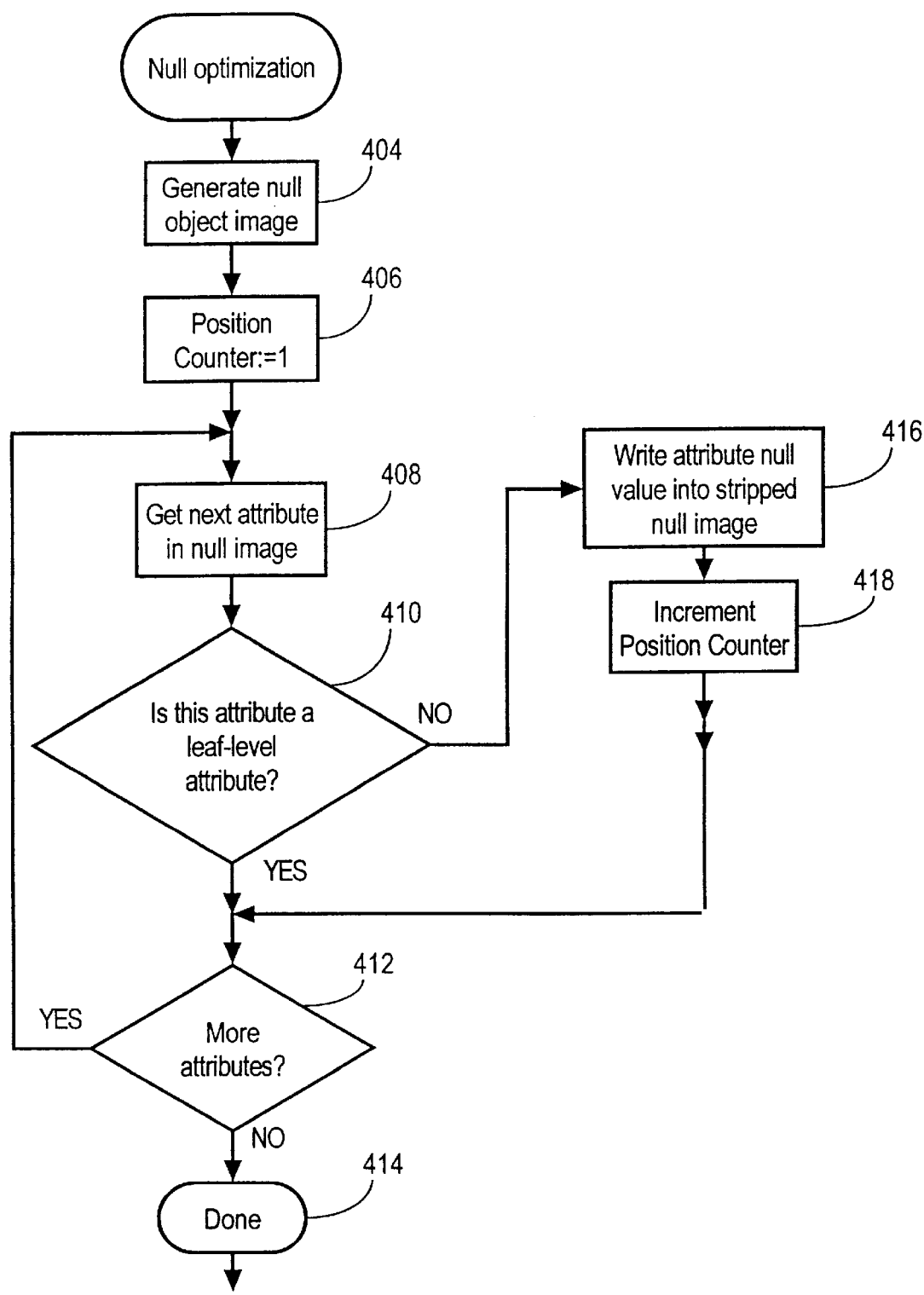
FIG. 4B is a flow diagram of a method of optimizing storage of null information.

An embodiment of such a method is shown in FIG. 4B. In block 404, a null image is generated. The null image is a pickled, linearized representation of a null object. The null object is a data structure having the same attribute layout as an information object for which the null object is tracking null values.

A separate, stripped null image is also allocated In block 406, a position indicator value is initialized. The position indicator value indicates a position within the stripped null image in bits at which null values are written.

In block 408, the next attribute is retrieved from the null image. Based on the above-described attribute metadata, in block 410 the attribute is evaluated to determine whether it is a leaf-level attribute. A leaf-level attribute is an attribute of an ADT that has no subordinate or child attributes. For example, in the Employee Object ADT of Table 1, the Name, Hired, Salary, Position, and Employee-Number attributes are leaf-level attributes because they refer to ADTs that have other attributes.

If the current attribute is a leaf-level attribute, then no information is written into the stripped null image. Instead, the system uses the null attribute values to carry null information. The current attribute is simply ignored, and the stripped null image ultimately is smaller because it does not contain information for leaf level attributes.

In block 412, the method tests whether the null image contains more attributes. If so, the method loops block to block 408 to process the next attribute. If there are no other attributes in the null image, control is passed to block 414 at which point the method is complete.

If the current attribute is not a leaf level attribute, then the stripped null image is loaded with a null value reflecting whether that attribute is null. As shown in block 416, the attribute null value for the current attribute is copied from the null image to the stripped null image. In block 418, the current position indicator is incremented. Control then passes to block 412 to test whether the null image has more attributes.

Thus, the stripped null image is written with only those null values that are not automatically stored by the database server in association with a column that is storing an attribute value. As a result, the stripped null image requires far less storage space.

Preferably, stripping is performed when the size of the stripped image is computed to be at least 2 bytes smaller than the original, unstripped null image.

A reciprocal method is carried out to convert a stripped null image to an unstripped null image. For each attribute in the stripped null image, the attribute value is added to the unstripped image. For leaf-level attributes, attribute null values are added to the unstripped null image by copying the values from their location in association with attribute values, their in the object image, or in columns of a data base table that is storing the object and its attribute values.

Hardware Environment

Figure 6:
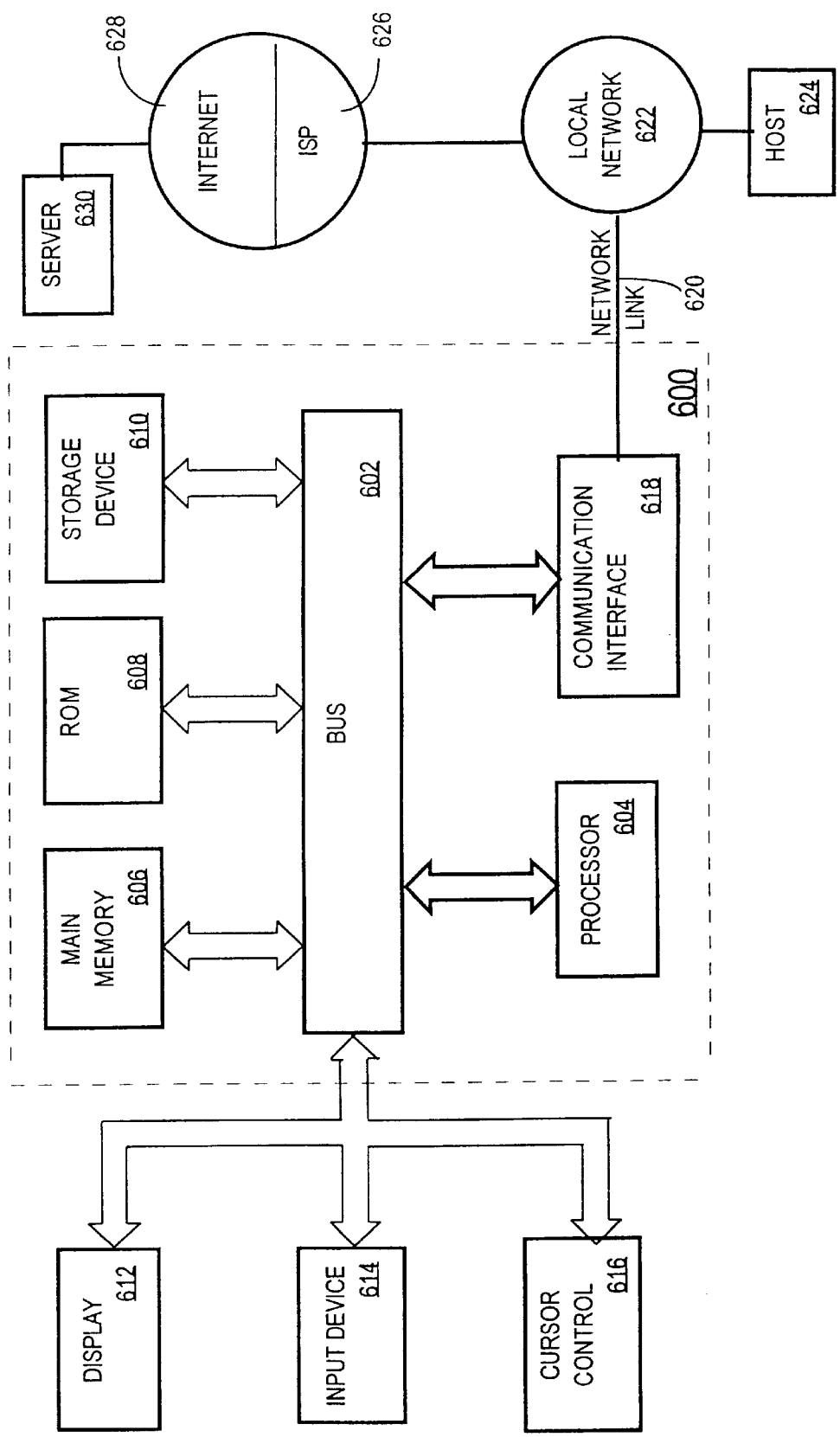
FIG. 6 is a diagram of a computer system with which the invention can be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for storing and using pickled images of information objects in database tables, storing object collections, and storing and using null objects. According to one embodiment of the invention, such object storage and use is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for storing and using pickled images of information objects in database tables, storing object collections, and storing and using null objects, as described herein.

The received code may be executed by processor 604 as it is received, and/or stored in storage device 610, or other non-volatile storage for later execution. In this manner, computer system 600 may obtain application code in the form of a carrier wave.

The methods and mechanisms described herein provide efficient ways to accomplish data storage in a database system. For example, objects stored in the form of images in a database table can serve as a backing store for objects in memory, replacing storage of graphs in memory, or caches.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method of optimizing retrieval of an information object, comprising the steps of:
   storing a first information object in a storage location;
   storing in association with the first information object, a second information object that stores information indicating whether said information object is storing a null value; and
   accessing said first information object only when said information indicates that said information object is not storing a null value.

2. The method recited in claim 1, wherein said first information object has a first attribute, the method further comprising the step of
   storing an attribute null value indicator in said second information object that indicates whether said first attribute is null.

3. The method recited in claim 2, further comprising the step of storing said attribute null value indicator as a null code indicating whether said first attribute of said information object is null, not null, or not nullable.

4. The method recited in claim 2, further comprising the steps of:
   storing a parent attribute, and a child attribute related subordinately to said parent attribute, in said second information object; and
   setting a child null code of said child attribute to "not nullable" when a parent null code of said parent attribute is "null".

5. The method recited in claim 2, further comprising the steps of:
   pickling said second information object into a linearized representation of said second information object; and
   storing said linearized representation in a column of a table of a database system in association with said first information object.

6. The method recited in claim 5, further comprising the steps of:
   pickling said first information object into an image of said first information object comprising a prefix segment and a data segment; and
   storing said linearized representation in said prefix segment of said image.

7. The method recited in claim 2, further comprising the steps of:
   receiving a request to retrieve a value of said first attribute of said first information object; and
   retrieving said value of said first attribute from said first information object only when said attribute null value indicator indicates that said first attribute is not null.

8. The method recited in claim 1, further comprising the steps of:
   instantiating said first information object according to a definition of an abstract data type having a plurality of attributes; and
   storing said second information object in the form of an array of unsigned two-byte quantities, wherein each of the unsigned two-byte quantities is associated with one of the attributes of the abstract data type.

9. The method recited in claim 1, further comprising the steps of:
   storing, in said second information object, an attribute null value indicator that indicates whether said first attribute of said first information object is storing a null value, only when said first attribute is a non-leaf-level attribute.

10. The method recited in claim 9, further comprising the step of repeating the step of storing an attribute null value indicator for each attribute in said first information object.

11. The method recited in claim 1, further comprising the step of storing an atomic null value indicator in said second information object that indicates whether said information object is atomically null.

12. The method recited in claim 1, wherein said first information object has a first attribute, the method further comprising the steps of:
   storing an atomic null value indicator in said second information object that indicates whether said information object is atomically null; and
   accessing said first attribute only when said attribute null value indicator indicates that said first attribute is not null.

13. The method of claim 1, wherein said first information object has a first attribute, the method further comprising the steps of:
   storing an atomic null value indicator in said second information object that indicates whether said information object is atomically null; and accessing said first attribute null value indicator only when said atomic null value indicator indicates that said information object is not atomically null.

14. In a database system that stores each attribute of an information object in a column of a database table, and that stores for said information object a null indicator value in association with each column, a method of optimizing retrieval of said information object from said database table, comprising the steps of:

establishing a null image in association with said information object; and for each attribute of said information object, storing an attribute null value indicator in said null image only when said attribute is a non-leaf-level attribute.

15. In a database system that stores each attribute of an information object in a column of a database table, and that stores for said information object a null indicator value in association with each column, a method of optimizing retrieval of said information object from said database table, comprising the steps of:

generating a null object image, in association with said information object, that stores a null value indicator for said information object and for each said attribute that indicates whether said information object and each said attribute is storing valid information;

establishing a stripped null image in association with said information object; and for each attribute of said information object, storing an attribute null value in said stripped null image only when said attribute is a non-leaf-level attribute.

16. A computer program product that includes a medium readable by a processor, the medium having stored thereon a sequence of instructions which, when executed by said processor, causes said processor to optimize accesses to a first information object by causing said processor to execute the steps of:

storing said first information object in a storage location;

storing in association with the first information object, a second information object that stores information indicating whether said information object is storing a null value; and accessing said first information object only when said information indicates that said information object is not storing a null value.

17. The computer program product recited in claim 16, wherein said sequence of instructions further comprises instructions that cause said processor to execute the step of storing an attribute null value indicator in said second information object that indicates whether said first attribute is null.

18. The computer program product recited in claim 17, wherein said sequence of instructions further comprises instructions that cause said processor to execute the step of storing said attribute null value indicator as a null code indicating whether said first attribute of said information object is null, not null, or not nullable.

19. The computer program product recited in claim 18, wherein said sequence of instructions further comprises instructions that cause said processor to execute the steps of:

storing a parent attribute, and a child attribute related subordinately to said parent attribute, in said second information object; and setting a child null code of said child attribute to "not nullable" when a parent null code of said parent attribute is "null".

20. The computer program product recited in claim 17, further comprising sequences of instructions for performing the steps of:

receiving a request to retrieve a value of said first attribute of said first information object; and retrieving said value of said first attribute from said first information object only when said attribute null value indicator indicates that said first attribute is not null.

21. The computer program product recited in claim 16, wherein said sequence of instructions further comprises instructions that cause said processor to execute the step of storing said linearized representation in a prefix segment associated with of said first information object.

22. The computer program product recited in claim 16, further comprising the steps of:

receiving a request to retrieve a value of said first attribute of said first information object; and retrieving said value of said first attribute from said first information object only when said attribute null value indicator indicates that said first attribute is not null.

23. The computer program product recited in claim 16, further comprising the steps of:

instantiating said first information object according to a definition of an abstract data type having a plurality of attributes; and storing said second information object in the form of an array of unsigned two-byte quantities, wherein each of the unsigned two-byte quantities is associated with one of the attributes of the abstract data type.

24. A computer apparatus for optimizing accesses to a first information object, comprising:

a processor; and a memory coupled to said processor, the memory having stored therein said first information object having a first attribute; and sequences of instructions which, when executed by said processor, cause said processor to identify said null value by causing the processor to perform the steps of:

storing, in said memory, a second information object associated with said first information object, wherein said second information object comprises a second attribute corresponding to said first attribute of said first information object, and information indicating whether said first information object and said first attribute are storing said null value.

25. The computer program product recited in claim 16, further comprising sequences of instructions for performing the steps of:

pickling said first information object into an image of said first information object comprising a prefix segment and a data segment; and storing said linearized representation in said prefix segment of said image.

26. The computer program product recited in claim 16, further comprising sequences of instructions for performing the steps of:

instantiating said first information object according to a definition of an abstract data type having a plurality of attributes; and storing said second information object in the form of an array of unsigned two-byte quantities, wherein each of the unsigned two-byte quantities is associated with one of the attributes of the abstract data type.

27. The computer program product recited in claim 16, further comprising sequences of instructions for performing the steps of:

storing, in said second information object, an attribute null value indicator that indicates whether said first attribute of said first information object is storing a null value, only when said first attribute is a non-leaf-level attribute.

28. The computer program product recited in claim 27, further comprising sequences of instructions for performing the step of repeating the step of storing an attribute null value indicator for each attribute in said first information object.

29. The computer program product recited in claim 16, further comprising sequences of instructions for performing the step of storing an atomic null value indicator in said second information object that indicates whether said information object is atomically null.

30. The computer program product recited in claim 16, wherein said first information object has a first attribute, the computer program product further comprising sequences of instructions for performing the steps of:

storing an atomic null value indicator in said second information object that indicates whether said information object is atomically null; and accessing said first attribute only when said attribute null value indicator indicates that said first attribute is not null.

31. The computer program product of claim 16, wherein said first information object has a first attribute, the computer program product further comprising sequences of instructions for performing the steps of:

storing an atomic null value indicator in said second information object that indicates whether said information object is atomically null; and accessing said first attribute null value indicator only when said atomic null value indicator indicates that said information object is not atomically null.

32. A computer apparatus for optimizing accesses to a first information object, comprising:

a processor; and a memory coupled to said processor; the memoroy having stored therein said first information object having a first attribute; and sequences of instructions which, when executed by said processor, cause said processor to identify said null value by causing the processor to perform the steps of:

storing, in said memory, a second information object associated with said first information object, wherein said second information object comprises a second attribute corresponding to said first attribute of said first information object, and information indicating whether said first information object and said first attribute are storing said null value.

33. A computer data signal embodied in a carrier wave, said computer data signal comprising sequences of instructions which, when executed by a processor, cause said processor to carry out optimizing retrieval of an information object, by causing said processor to execute the steps of:

storing a first information object and a first attribute of said information object in a storage location;

storing in association with the first information object, a second information object that stores information indicating whether said information object is storing a null value; and accessing said first information object only when said information indicates that said information object is not storing a null value.

34. The computer data signal recited in claim 33, wherein said first information object has a first attribute, the computer data signal further comprising sequences of instructions for performing the step of storing an attribute null value indicator in said second information object that indicates whether said first attribute is null.

35. The computer data signal recited in claim 34, further comprising sequences of instructions for performing the step of storing said attribute null value indicator as a null code indicating whether said first attribute of said information object is null, not null, or not nullable.

36. The computer data signal recited in claim 34, further comprising sequences of instructions for performing the steps of:

storing a parent attribute, and a child attribute related subordinately to said parent attribute, in said second information object; and setting a child null code of said child attribute to "not nullable" when a parent null code of said parent attribute is "null".

37. The computer data signal recited in claim 34, further comprising sequences of instructions for performing the steps of:

pickling said second information object into a linearized representation of said second informmation object; and storing said linearized representation in a column of a table of database system in association with said first information object.

38. The computer data signal recited in claim 37, further comprising sequences of instructions for performing the steps of:

pickling said first information object into an image of said first information object comprising a prefix segment and a data segment; and storing said linearized representation in said prefix segment of said image.

39. The computer data signal recited in claim 34, further comprising sequences of instructions for performing the steps of:

receiving a request to retrieve a value of said first attribute of said first information object; and retrieving said value of said first attribute from said first information object only when said attribute null value indicator indicates that said first attribute is not null.

40. The computer data signal recited in claim 33, further comprising sequences of instructions for performing the steps of:

instantiating said first information object according to a definition of an abstract data type having a plurality of attributes; and storing said second information object in the form of an array of unsigned two-byte quantities, wherein each of the unsigned two-byte quantities is associated with one of the attributes of the abstract data type.

41. The computer data signal recited in claim 33, further comprising sequences of instructions for performing the steps of:

storing, in said second information object, an attribute null value indicator that indicates whether said first attribute of said first information object is storing a null value, only when said first attribute is a non-leaf-level attribute.

42. The computer data signal recited in claim 41, further comprising sequences of instructions for performing the step of repeating the step of storing an attribute null value indicator for each attribute in said first information object.

43. The computer data signal recited in claim 33, further comprising sequences of instructions for performing the step of storing an atomic null value indicator in said second information object that indicates whether said information object is atomically null.

44. The computer data signal recited in claim 33, wherein said first information object has a first attribute, the computer data signal further comprising sequences of instructions for performing the steps of:

storing an atomic null value indicator in said second information object that indicates whether said information object is atomically null; and accessing said first attribute only when said attribute null value indicator indicates that said first attribute is not null.

45. The computer data signal of claim 33, wherein said first information object has a first attribute, the computer data signal further comprising sequences of instructions for performing the steps of:

storing an atomic null value indicator in said second information object that indicates whether said information object is atomically null; and accessing said first attribute null value indicator only when said atomic null value indicator indicates that said information object is not atomically null.

* * * * *